US010672393B2

(12) United States Patent
Rivlin et al.

(10) Patent No.: US 10,672,393 B2
(45) Date of Patent: Jun. 2, 2020

(54) TIME CAPSULE BASED SPEAKING AID

(71) Applicant: Intel Corporation, Santa Clara, CA (US)

(72) Inventors: Ze'ev Rivlin, Ra'anana (IL); Vered Bar Bracha, Tel Aviv (IL); Douglas Gabel, Hillsboro, OR (US); Jonathan Huang, Pleasanton, CA (US); Sylvia Downing, El Dorado Hills, CA (US); Binuraj Ravindran, San Jose, CA (US); Willem Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 15/869,899

(22) Filed: Jan. 12, 2018

(65) Prior Publication Data

US 2019/0043490 A1 Feb. 7, 2019

(51) Int. Cl.
*G10L 15/22* (2006.01)
*G10L 15/05* (2013.01)
*G10L 15/197* (2013.01)
*G06F 3/16* (2006.01)
*G10L 15/07* (2013.01)
*G09B 5/06* (2006.01)
(Continued)

(52) U.S. Cl.
CPC ............ *G10L 15/197* (2013.01); *G06F 3/167* (2013.01); *G06F 40/274* (2020.01); *G09B 5/06* (2013.01); *G10L 15/05* (2013.01); *G10L 15/07* (2013.01); *G10L 15/22* (2013.01); *G09B 19/04* (2013.01); *G10L 15/142* (2013.01); *G10L 15/16* (2013.01); *G10L 2015/221* (2013.01)

(58) Field of Classification Search
CPC ................................ G10L 15/22; G10L 15/05
See application file for complete search history.

(56) References Cited

U.S. PATENT DOCUMENTS 9,378,740 B1 * 6/2016 Rosen ................. G10L 15/1822
10,049,656 B1 * 8/2018 Barton .................. G10L 15/183
(Continued)

OTHER PUBLICATIONS

Kalwad, P. S., Pattanaik, S., Chandana, T. L., & Reddy, G. (Aug. 2015). Language Modelling and English Speech Prediction System to Aid People with Stuttering Disorder. In Proceedings of the Third International Symposium on Women in Computing and Informatics (pp. 191-195). ACM.*

*Primary Examiner* — Bryan S Blankenagel
(74) *Attorney, Agent, or Firm* — Jordan IP Law, LLC

(57) ABSTRACT

A system, apparatus, method, and computer program product for a speaking aid. The system including network interface circuitry to receive speech input from a user. The speech input includes a partial sentence with a missing word or the partial sentence with a stuttered word. The system also includes a processor coupled to the network interface circuitry and one or more memory devices coupled to the processor. The one or more memory devices include instructions, that when executed by the processor, cause the system to detect a stutter or pause in the speech input, predict the stuttered word or the missing word, present a predicted word from an n-best list to the user; and if a prompt is received from the user, present a next word from the n-best list until the user speaks a correct word to replace the stutter or the pause.

25 Claims, 9 Drawing Sheets

(51) Int. Cl.
  *G06F 40/274*   (2020.01)
  *G10L 15/14*   (2006.01)
  *G10L 15/16*   (2006.01)
  *G09B 19/04*   (2006.01)

(56) References Cited

U.S. PATENT DOCUMENTS

| | | | | |
|---|---|---|---|---|
| 10,102,851 | B1* | 10/2018 | Kiss | G10L 15/1822 |
| 2008/0154600 | A1* | 6/2008 | Tian | G10L 15/083 |
| | | | | 704/251 |
| 2010/0312556 | A1* | 12/2010 | Ljolje | G10L 15/07 |
| | | | | 704/244 |
| 2016/0164813 | A1* | 6/2016 | Anderson | H04L 51/16 |
| | | | | 709/206 |
| 2017/0091168 | A1* | 3/2017 | Bellegarda | G06F 17/276 |
| 2017/0236511 | A1* | 8/2017 | Zhao | G10L 15/01 |
| | | | | 704/240 |
| 2019/0200050 | A1* | 6/2019 | Zhang | G06F 17/27 |

* cited by examiner

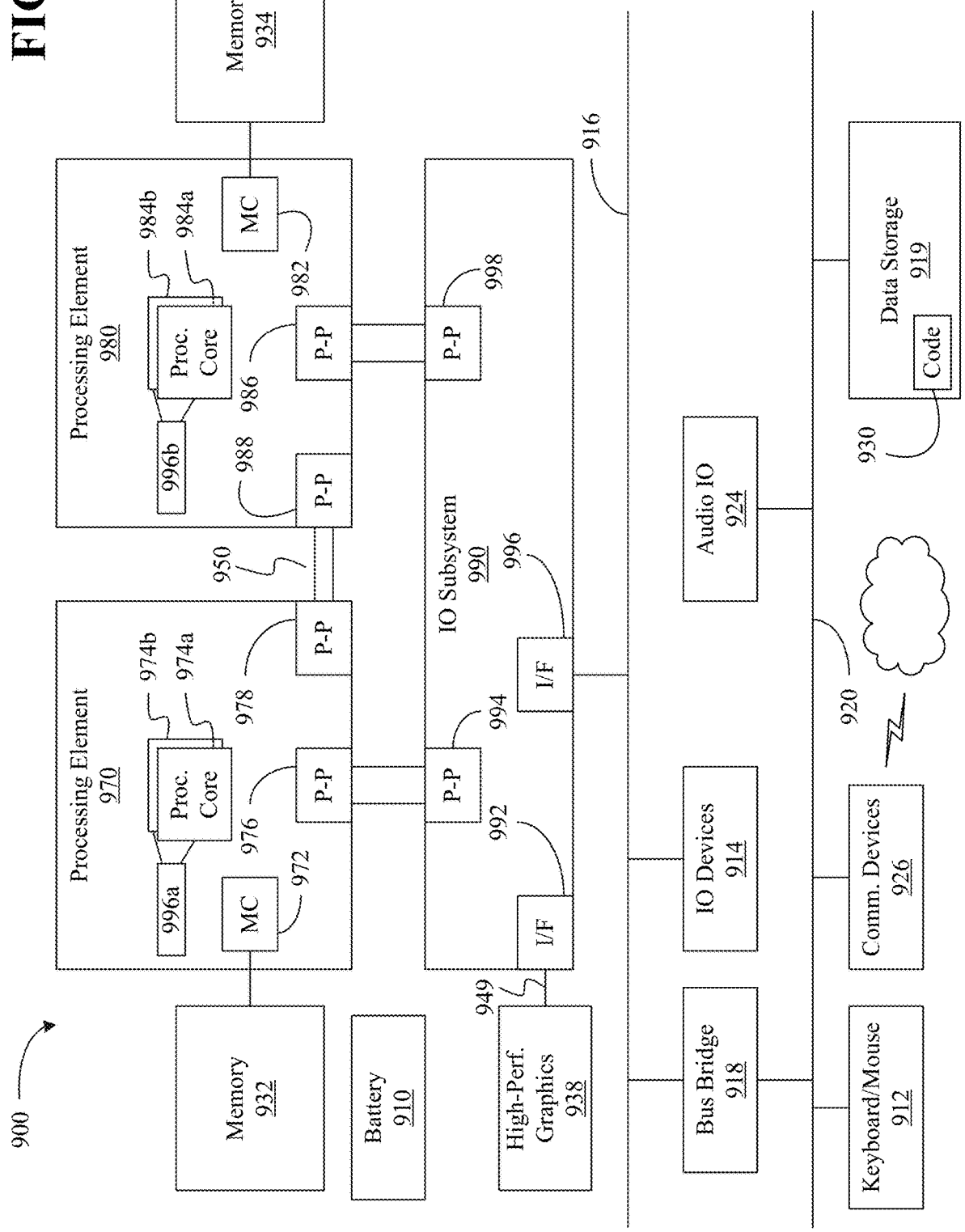

TIME CAPSULE BASED SPEAKING AID

TECHNICAL FIELD

Embodiments generally relate to automatic speech recognition. More particularly, embodiments relate to a time capsule based speaking aid.

BACKGROUND

In general, age related perceptual declines in hearing and vision begin in the fourth decade, followed by cognitive decline. Aging influences a person's ability to communicate effectively as both a speaker and a listener. Strokes, accidents or other diseases can also impair speech capability of a person in addition to aging.

Hearing aids are small, battery powered electronic devices designed to improve one's hearing ability. Hearing aids provide amplification, noise filtering, slow speech and similar speech enhancement algorithms to compensate and assist with acoustic environment capture. Such devices focus on listening ability, but not on speaking ability. Assistance in articulating an idea is completely out of scope for a hearing assistance device.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an exemplary computing system according to an embodiment.

Figure 1:
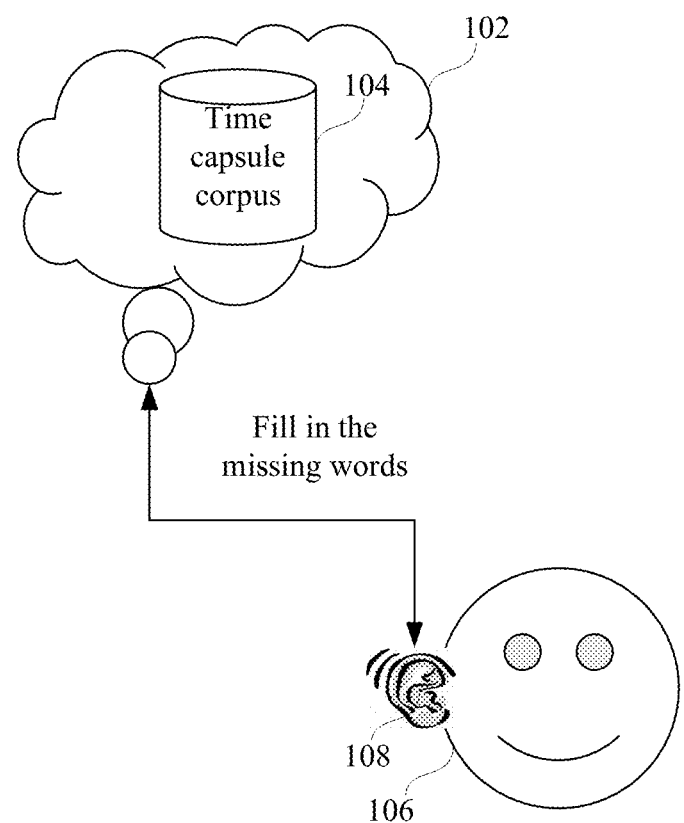
FIG. 1 is a diagram illustrating an overall concept of a time capsule corpus filling in a missing word to a user according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Embodiments relate to technology that provides a speaking aid. A speaking aid enhances the speaking ability of a user by providing the user assistance in articulating speech through the suggestion of one or more missing words that the user struggles to speak while trying to verbalize a sentence. In other words, the system helps a person find "the missing word" to say when they cannot remember a word by whispering the missing word in the ear of the user or displaying the word to the user. In embodiments, a personal language model or time capsule corpus is created over time. The personal language model evolves and adapts over time, and can be used in real time to retain all aspects of auditory and cognitive processing capabilities of a user. In an embodiment, the system may predict the probability of a word based on the words spoken by the user prior to the missing word. When the user is talking, and all of a sudden cannot remember a word they are trying to speak, the system will whisper the missing word into the ear of the user or show the missing word on a nearby screen/display to the user using the user's personal language model and portions of the speech leading up to the missing word as input to a prediction engine to predict the probability of a word the user is trying to say. In another embodiment, the system may be used to aid the speech of one who has a dysfluency, such as, for example, the dysfluency of stuttering. In the instance of a stutter, the system will whisper the stuttered word into the ear of the user or display the stuttered word to the user using the user's personal language model, portions of the speech leading up to the stutter, and the stutter sound made by the user when trying to speak as input to the prediction engine to predict the probability of the stuttered word the user is trying to say. In embodiments, a prioritized n-best list of the most probable words (missing or stuttered) may be presented to the user to allow the user to select the word the user is trying to say.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 is a diagram illustrating a general concept of a time capsule corpus (also referred to as a personal language model) filling in a missing word to a user according to an embodiment. A user 106 is 50 years old. The user 106 has been building a time capsule corpus 104 for twenty years. The time capsule corpus 104 may be located remotely from the user 106. In one embodiment, the time capsule corpus 104 may be located in a cloud 102. In another embodiment, the time capsule corpus 104 may be located locally to the user 106, such as, for example, in a storage device located in the home of the user 106 (not shown) or in a storage device of an electronic device (not shown) owned by the user 106. The electronic device may be a mobile device, such as, for example, a mobile phone, a wearable device, a laptop, a tablet, etc. In the case of a wearable device, the time capsule corpus 104 may be located on a companion mobile device and the wearable device may communicate wirelessly with the companion device using wireless technologies such as, for example, Bluetooth, WiFi, or any other wireless means of communication.

The time capsule corpus 104 is a historic cache of information, collected over time, intended to aid one's speaking abilities as one progresses in age and/or has a dysfluency. The time capsule corpus 104 may be, for example, a collection of recorded utterances of the user 106 over time. The collected utterances may include context metadata to aid in the location of information that may be used to help determine a missing word or a stuttered word that the user 106 may be trying to say. In the instant scenario, the user 106 has been building the time capsule corpus 104 for 20 years. Thus, the time capsule corpus 104 may include a great deal of information about the life of the user 106 over the 20-year period. The time capsule corpus 104 does not have to contain information over a long period of time, such as twenty years. In embodiments, the contents of the time capsule corpus 104 may be over a shorter period of time, such as, for example, a week, a month, or a year. The time capsule corpus may further be aided by a standard corpus containing statistically ordered speech patterns most common to a given language. The standard corpus could be shipped with the system to provide an immediate benefit of missing words out of the box.

In one example, the user 106 is talking to a friend, Paul, whom he has not seen in 15 years. During the conversation, the user 106 says, "[h]ey Paul, remember when we use to play _____", and then the user 106 pauses because he cannot remember the word he wants to say to Paul. Lucky for the user 106, the time capsule corpus 104, in conjunction with the words leading up to the "missing word", is able to locate utterances from 15 to 20 years ago about Paul and realizes from early conversations between the user 106 and Paul that they played basketball together. The word "basketball" is whispered to the user 106 through an earpiece 108. This enables the user 106 to complete his sentence, saying "basketball together."

In another example, the user 106 has a speech disorder causing the user 106 to stutter. In this example, the user is 16. She has been building the time capsule corpus 104 for 10 years. The user 106 is talking to Sally, her childhood friend. During the conversation she says, "Sally, remember how we loved climbing the monkey bars. I always got nervous when you would try to make me ju-ju-ju," and then the user 106 pauses because she is having a difficult time saying the word. The time capsule corpus, in conjunction with the words leading up to the stuttered word and the stuttered sound, realizes from various utterances between the user 106 and Sally that the user 106 was terrified of jumping off the monkey bars and that Sally was always trying to get the user 106 to "jump". The word "jump" is whispered to the user through the earpiece 108. This enables the user 106 to calm down and complete the sentence by saying "jump off."

Figure 2:
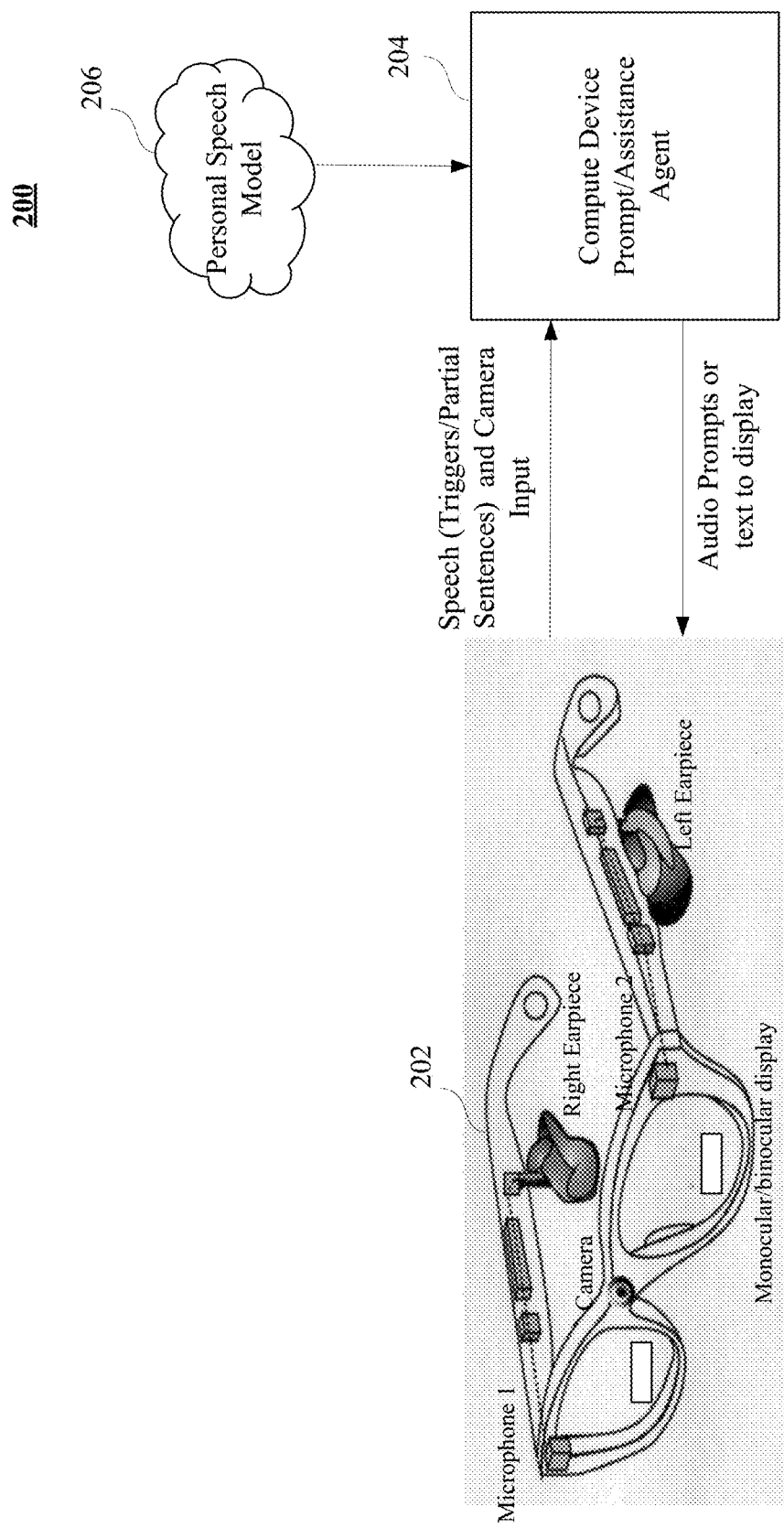
FIG. 2 is a diagram illustrating an example speaking aid system according to an embodiment.

FIG. 2 is a diagram illustrating an example speaking aid system 200 according to an embodiment. The speaking aid system 200 comprises smart eyewear 202, a computing device having a prompt/assistance agent 204, and personal speech models 306206 stored in a cloud. The smart eyewear 202 includes two microphones (Microphone 1 and Microphone 2) to receive audio data from a user, such as, for example, user 106 in FIG. 1, two earpieces (a right earpiece and a left earpiece) to receive missing and stuttered words from the prompt/assistance agent of computing device 204, a camera for enabling the prompt/assistance agent to view the surroundings of the user and to aid in identifying people in which the user is communicating, and two monocular/binocular displays (one on each eyeglass) to provide text to the user. Although the smart eyewear 202 shows two microphones, the smart eyewear 202 is not limited to two microphones. In one embodiment, the smart eyewear 202 may have a single microphone similar to a phone headset. In another embodiment, the smart eyewear 202 may include more than two microphones. In embodiments, the smart eyewear 202 may also include more than one camera. Although not explicitly shown, communication between the smart eyewear 202, the computing device 204 and the cloud 206 may be via a network interface using wired or wireless technology.

Speech is continuously transmitted via the microphones to the computing device 204. When a user pauses or stutters, the system uses the established time capsule corpus (personal speech model) and the spoken words of the user to predict the missing or stuttered word. The missing or stuttered word may be transmitted to the user by whispering the word into the left and right earpieces or by displaying the word on the monocular/binocular display or a nearby remote display.

The camera may be used to identify people, places and things. Input from the camera is sent to the computing device 204 for person/object recognition. In this instance, the cloud may also store information that may identify the person/object by name. This feature enables the user, who has forgotten the name of the person in front of them, to provide the computing device 204 with a photo or a view of the person and in turn, the system will respond by whispering the name and details of the person to the user via the left and right earpieces or send the name and details of the person to the user by text via the monocular/binocular displays. The system 200 learns changes over time from all interactions with the smart eyewear 202 and adapts or adjusts the personal speech model accordingly. In one embodiment, the speaking aid system 200 may also be used to build the personal speech model as well as adapt or adjust the model based on interactions with the system 200.

Embodiments are not limited to the speaking aid system 200. One skilled in the relevant arts would know that other speaking aid systems may be used. For example, system 600, described below with reference to FIG. 6, may also be used.

Figure 3:
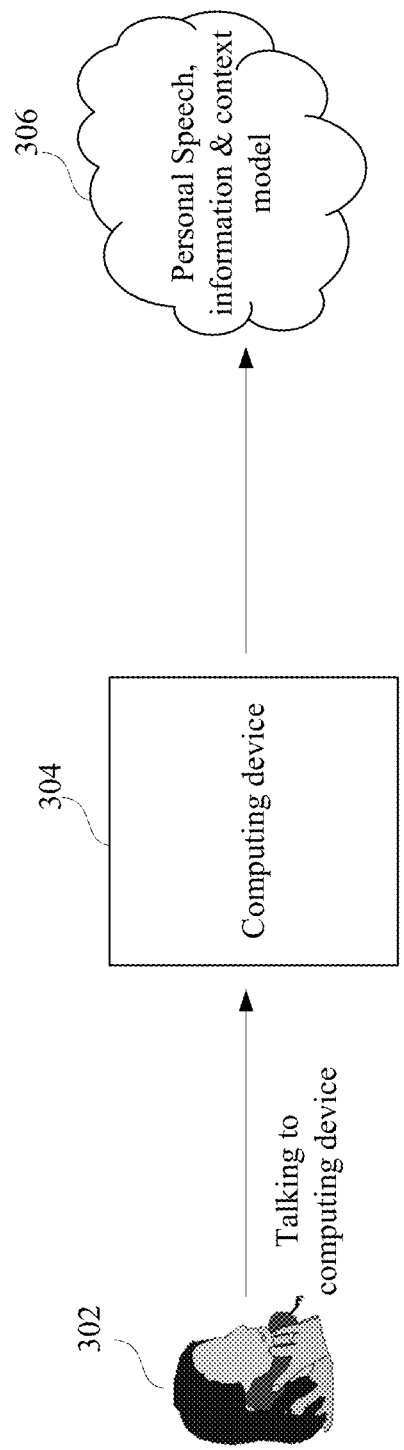
FIG. 3 is a diagram illustrating one way that a user may build their time capsule corpus (i.e., personal language model) according to an embodiment.

FIG. 3 is a diagram illustrating one way in which a user may build their time capsule corpus according to an embodiment. A user 302 is shown talking on a phone. While talking, the voice of the user 302 is being recorded by a computing device 304 to build a personal language model for the user 302 (also referred to as her personal time capsule corpus). The computing device 304 may be a smart phone wherein the user 302 is talking using the smart phone device. The computing device 304 may store the recordings locally on the computing device 304 or a local storage device, or it may send her voice recordings to the cloud 306 for storage in the cloud 306. When storing the recordings, information and context metadata may be added to make finding and working with particular instances of recordings easier. For example, a recording may include information and context metadata that includes, but is not limited to, user name, date and time created, who the user is talking to or sending a message to, what the user is talking or writing about, location of the user, activity of the user, and any other information that may describe the content of the recording or document. The information collected may be used to service the user 302 for the benefit of the user 302 in the near or distant future when the user 302 needs help trying to speak a missing or stuttered word. So, over years of time the system is learning the person's language model by listening to a plurality of in-person conversations, phone conversations, or other means of communication, such as, for example, by storing texts, emails, notes, etc.

Creating a personal language model over time allows for a more robust speaking aid that compensates for slower memory recall when the user 302 is older or sick. The personal language model is continuously updated over time until the user 302 begins to show signs of cognitive deterioration that might make the predictions inaccurate. In many instances, as people age, they are more likely to experience memory lapses where they cannot readily remember names, places and objects (i.e., things). Having a personal language model that is developed over time is essential to the speaking aid in helping to correct memory lapses because it contains so much knowledge about where a person has been and what they have experienced over time. Even though a person may forget some of the details of their experiences, with the help of the speaking aid, the personal language model allows the person to fill in the memory gap and have a productive conversation.

Figure 4:
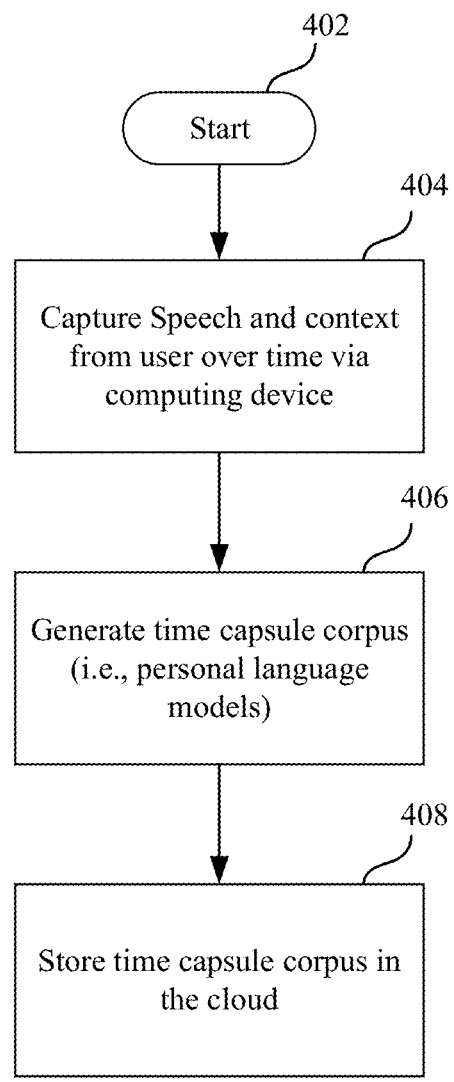
FIG. 4 is a flow diagram of an example method for creating a time capsule corpus (i.e., personal language model) according to an embodiment.

FIG. 4 is a flow diagram for a method 400 of creating a time capsule corpus (i.e., a personal language model) according to an embodiment. The method 400 may generally be implemented in a system such as, for example, the speaking aid system 200 as shown in FIG. 2. More particularly, the method 400 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins at block 402, where the process immediately proceeds to block 404. In block 404 speech and context are captured from the user over time using a computing device. In one embodiment, the speech may be captured as audio via in-person conversations, phone conversations, oral readings of passages, and other means of capturing speech from the user. In another embodiment, the written word of the user may be captured via emails, texts, notes, and other documents written by the user. In yet another embodiment, both audio and the written word of the user may be captured. When the user begins to experience cognitive deterioration, the personal language models are no longer updated. The process proceeds to block 406.

In block 406, personal language models are generated in a well-known manner. Language models, in general, provide context to distinguish between words and phrases that have similar sounds. They can be used for information retrieval. There are many different types of language models, one type being an n-gram model. An n-gram model may be used to predict the next most likely word to occur in a sentence. The process then proceeds to block 408.

In block 408, the process may store the personal language model in the cloud. The personal language model is not restricted only to being stored in the cloud. In fact, it may be stored locally. As time goes on, and as the amount of data increases for the personal language model, the personal language model may require storage in the cloud.

Figure 5A:
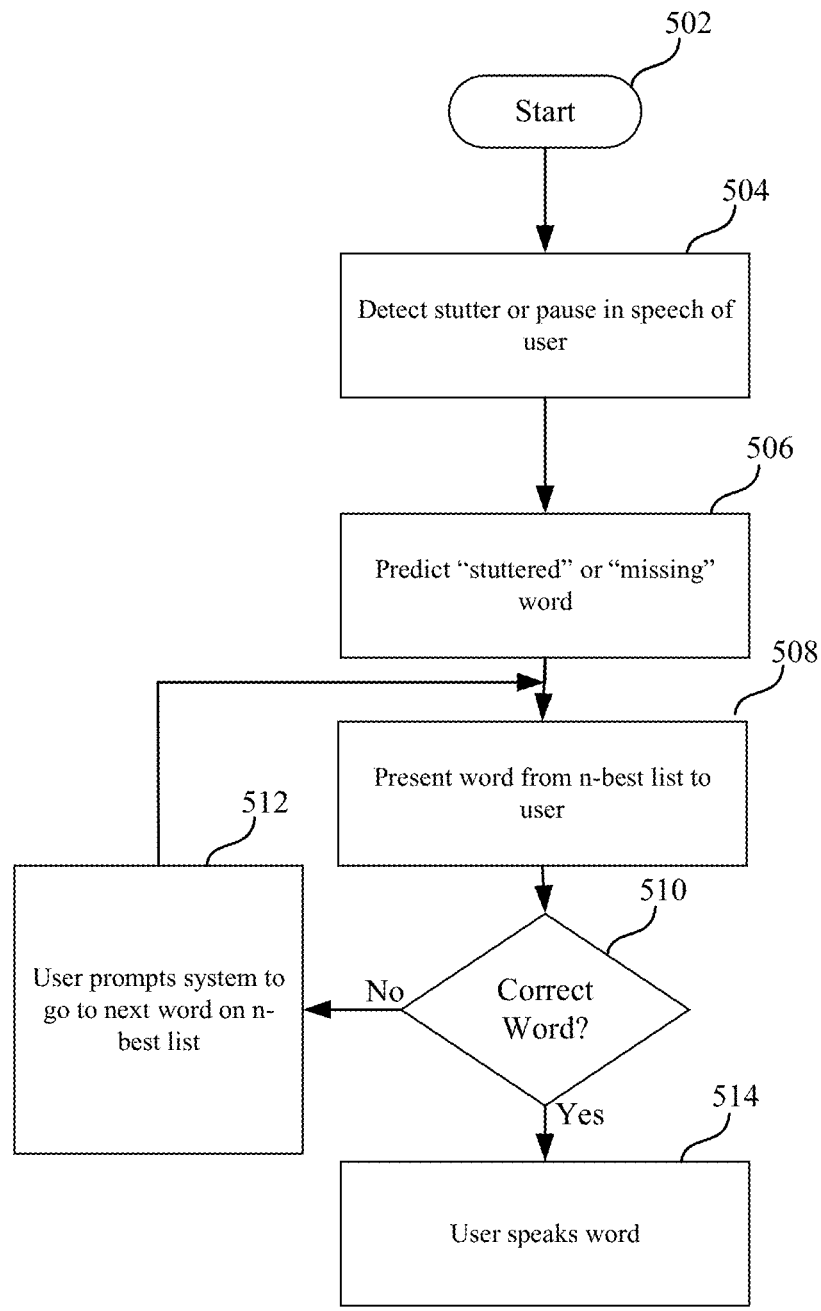
FIG. 5A is a flow diagram of an example method for providing speech assistance to a user according to an embodiment.

FIG. 5A is a flow diagram of a method 500 for providing speech assistance to a user according to an embodiment. The method 500 may generally be implemented in a system such as, for example, the speaking aid system 200 as shown in FIG. 2. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 502, where the process immediately proceeds to block 504. In block 504, the system detects a pause in speech or a stutter from a user. A pause in speech may be detected when a user has not completed a sentence and pauses for several seconds, breaking the fluidity of the sentence. For example, a user might say the following, "I can't find my <long pause> . . . . A stutter may be detected when the user repeats a portion of a word several times (the repetition of a sound several times) or uses a pause word like, for example, "uhhhhhh". For example, a user might state the following, "I remember when I was a kid playing in the neighborhood, we used to play ba-ba-ba-<pause> . . . . The process then proceeds to block 506.

In block 506, the missing or stuttered word is predicted. Predicting the missing or stuttered word is further described below with reference to FIG. 5B. The process then proceeds to block 508.

In block 508, a word is presented to the user from an n-best list. The word may be presented to the user by whispering the word in the user's ear, such as, for example, via the left and right earpiece of smart eyewear 202 shown in FIG. 2 or by displaying the word on a display, such as, for example, the monocular/binocular display of smart eyewear 202 shown in FIG. 2. The process proceeds to decision block 510.

In decision block 510, it is determined whether the missing or stuttered word presented to the user was correct. If the missing or stuttered word was not correct, the process proceeds to block 512.

In block 512, the system receives a prompt from the user indicating that the system may present the next best word from the n-best list to the user. The prompt may be an audio prompt in which the user speaks the word "next" to enable the system to move to the next word on the n-best list. In some embodiments, a gesture or some other form of communication that the user may easily and quickly perform may be used to prompt for the next option. The process then proceeds back to block 508, where the next word on the n-best list is presented to the user.

Returning to decision block 510, if it is determined by the user that the correct word has been presented, the process proceeds to block 514. In block 514, the user speaks the correct word.

Figure 5B:
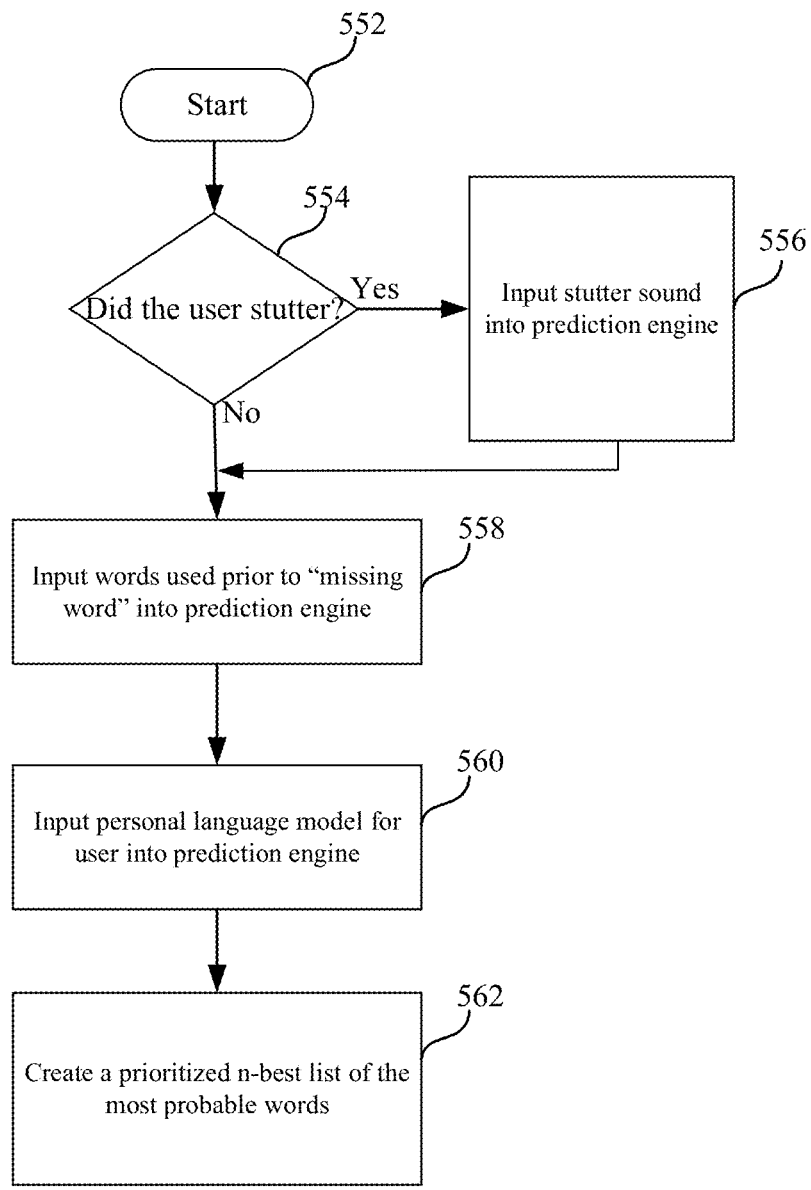
FIG. 5B is a flow diagram of an example method for predicting a stuttered or missing word according to an embodiment.

FIG. 5B is a flow diagram of an example method 550 for predicting a stuttered or missing word according to an embodiment. The method 550 may generally be implemented in a system such as, for example, the speaking aid system 200 as shown in FIG. 2. More particularly, the method 550 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins at block 552, where the process immediately proceeds to decision block 554. In decision block 554, it is determined whether the user stuttered. If the user stuttered the process proceeds to block 556.

In block 556, the stutter sound is input into a prediction engine. The process then proceeds to block 558.

Returning to decision block 554, if the user did not stutter, the process proceeds to block 558.

In block 558, the words used prior to a missing word or a stuttered word are input into the prediction engine. The process then proceeds to block 560.

In block 560, the personal language model for the user is input into the prediction engine. In one embodiment, context data, such as, for example, the current location and activity of the user, may also be used as input into the prediction engine. The prediction engine may be a neural network, a Hidden Markov Model (HMM), a statistical language model, or any other prediction engine that may predict what the next word or stuttered word will be. The process then proceeds to block 562.

In block 562, a prioritized n-best list of the n most probable words is created. The n-best list may be created using any of the prediction engines listed above. In one embodiment, an n-gram model may be used to predict the n-best list. For example, returning to the stutter example in which a user might state the following, "I remember when I was a kid playing in the neighborhood, we used to play ba-ba-ba-<pause> . . . . An example prioritized n-best list, based on the stutter sound of ba-ba-ba, the words spoken prior to the stutter ("I remember when I was a kid playing in the neighborhood, we used to play"), and the personal language model for the user, might include five (5) candidates of basketball with a probability of 0.9, baseball with a probability of 0.8, backgammon with a probability of 0.4, bowling with a probability of 0.2, and bocce with a probability of 0.1. Although bowling and bocce do not begin with the exact stutter sound, there are instances when the stutter sound may not be an exact match to a word, but based on the personal language model may be probable.

In one embodiment, only a single word may be predicted at a time. For example, returning to the missing word example in which a user might say "I can't find my <long pause> . . . ", the next word is predicted using the words spoken prior to the stutter ("I can't find my"), the personal language model for the user, and the current context data for the user. In the personal language model for the user, there are several utterances by the user in which the user has misplaced their mobile phone. The word "phone" would be an excellent prediction to whisper or display to the user in this instance.

Embodiments are not limited by the number of predictions that may be used. One or more predictions may be made without departing from the scope.

Figure 6:
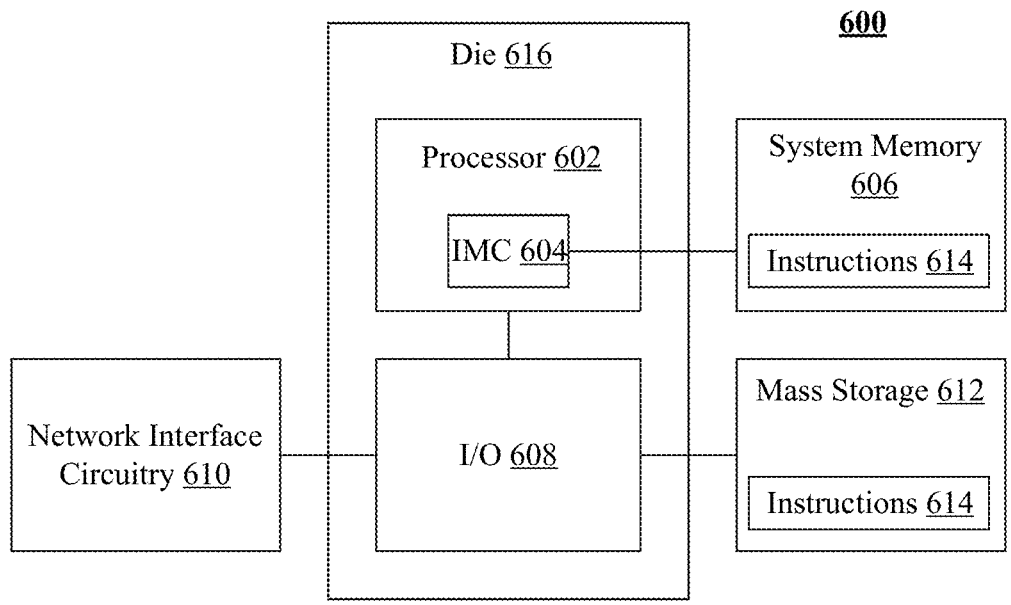
FIG. 6 is a block diagram of an example of a speaking aid system according to an embodiment.

FIG. 6 shows a system 600 that may be readily substituted for the speaking aid system shown above with reference to FIG. 2. The illustrated system 600 includes a processor 602 (e.g., host processor, central processing unit/CPU) having an integrated memory controller (IMC) 604 coupled to a system memory 606 (e.g., volatile memory, dynamic random access memory/DRAM). The processor 602 may also be coupled to an input/output (I/O) module 608 that communicates with network interface circuitry 610 (e.g., network controller, network interface card/NIC) and mass storage 612 (non-volatile memory/NVM, hard disk drive/HDD, optical disk, solid state disk/SSD, flash memory). The network interface circuitry 610 may receive speech input such as, for example, speech from a user triggering a stuttered or missing word (shown in FIG. 2) and send a stuttered or missing word to the user, wherein the system memory 606 and/or the mass storage 612 may be memory devices that store instructions 614, which when executed by the processor 602, cause the system 600 to perform one or more aspects of the method 400 (FIG. 4), the method 500 (FIG.

5A) and the method 550 (FIG. 5B), already discussed. Thus, execution of the instructions 614 may cause the system 600 to create and store a time capsule corpus over time (FIG. 4), detect a stutter or pause in speech from a user and provide the user with the correct stuttered or missing word (FIG. 5A), and predict a stuttered or missing word that the user was trying to speak (FIG. 5B). The processor 602 and the IO module 608 may be incorporated into a shared die 616 as a system on chip (SoC).

Figure 7:
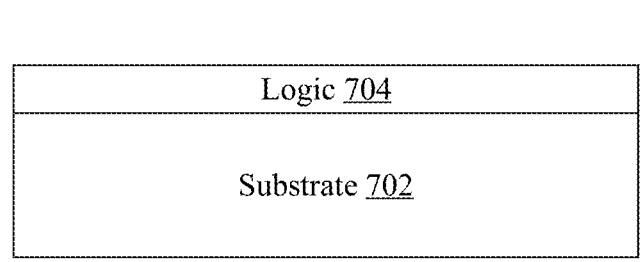
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the method 400 (FIG. 4), already discussed.

Figure 8:
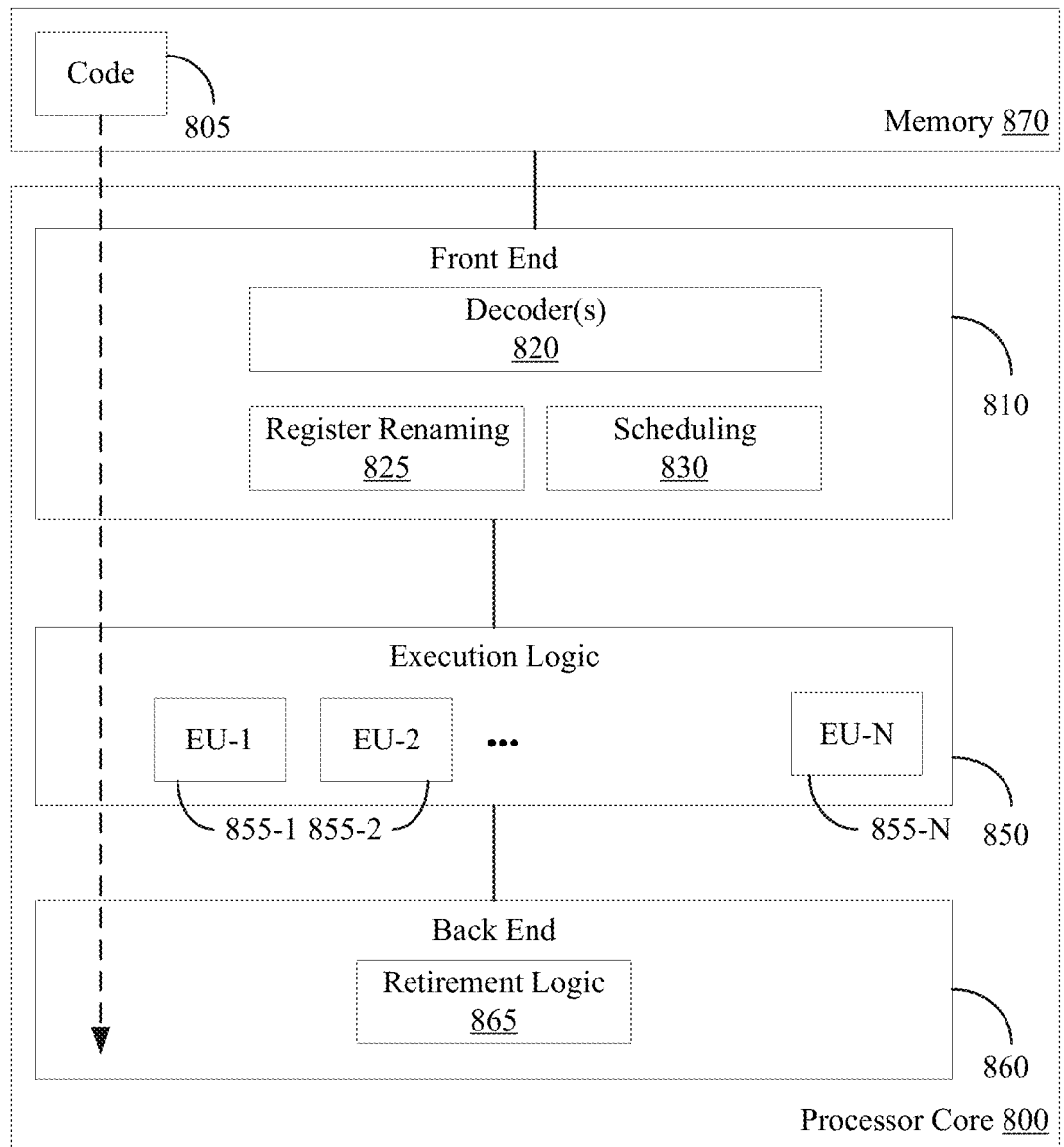
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement the method 400 (FIG. 4), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Referring now to FIG. 9, shown is a block diagram of a computing system 900 in accordance with an embodiment. Shown in FIG. 9 is a multiprocessor system 900 that includes a first processing element 970 and a second processing element 980. While two processing elements 970 and 980 are shown, it is to be understood that an embodiment of the system 900 may also include only one such processing element.

The system 900 is illustrated as a point-to-point interconnect system, wherein the first processing element 970 and the second processing element 980 are coupled via a point-to-point interconnect 950. It should be understood that any or all of the interconnects illustrated in FIG. 9 may be implemented as a multi-drop bus rather than point-to-point interconnect.

As shown in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code in a manner similar to that discussed above in connection with FIG. 8.

Each processing element 970, 980 may include at least one shared cache 996a, 996b. The shared cache 996a, 996b may store data (e.g., instructions) that are utilized by one or more components of the processor, such as the cores 974a, 974b and 984a, 984b, respectively. For example, the shared cache 996a, 996b may locally cache data stored in a memory 932, 934 for faster access by components of the processor. In one or more embodiments, the shared cache 996a, 996b may include one or more mid-level caches, such as level 2 (L2), level 3 (L3), level 4 (L4), or other levels of cache, a last level cache (LLC), and/or combinations thereof.

While shown with only two processing elements 970, 980, it is to be understood that the scope of the embodiments are not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, micro architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

The first processing element 970 may further include memory controller logic (MC) 972 and point-to-point (P-P)

interfaces 976 and 978. Similarly, the second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976 986, respectively. As shown in FIG. 9, the I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple the graphics engine 938 to the I/O subsystem 990. Alternately, a point-to-point interconnect may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the embodiments are not so limited.

As shown in FIG. 9, various I/O devices 914 (e.g., biometric scanners, speakers, cameras, sensors) may be coupled to the first bus 916, along with a bus bridge 918 which may couple the first bus 916 to a second bus 920. In one embodiment, the second bus 920 may be a low pin count (LPC) bus. Various devices may be coupled to the second bus 920 including, for example, a keyboard/mouse 912, communication device(s) 926, and a data storage unit 919 such as a disk drive or other mass storage device which may include code 930, in one embodiment. The illustrated code 930 may implement the method 400 (FIG. 4), already discussed, and may be similar to the code 805 (FIG. 8), already discussed. Further, an audio I/O 924 may be coupled to second bus 920 and a battery 910 may supply power to the computing system 900.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a speaking aid system comprising network interface circuitry to receive speech input from a user, the speech input including a partial sentence with a missing word or the partial sentence with a stuttered word, a processor coupled to the network interface circuitry, one or more memory devices coupled to the processor, the one or more memory devices including instructions, which when executed by the processor, cause the system to detect a stutter or pause in the speech input, predict the stuttered word or the missing word, present a predicted word from an n-best list to the user, and if a prompt is received from the user, present a next word from the n-best list until the user speaks a correct word to replace the stutter or the pause.

Example 2 may include the system of example 1, wherein instructions to present a predicted word from an n-best list to the user comprises instructions to whisper the predicted word into an earpiece of the user.

Example 3 may include the system of example 1, wherein instructions to present a predicted word from an n-best list to the user comprises instructions to display the predicted word on a display.

Example 4 may include the system of example 1, wherein instructions to predict the stuttered word or the missing word comprises instructions to input words used prior to the stuttered word or the missing word into a prediction engine, input a personal language model for the user into the prediction engine, if the user stuttered, input a stutter sound into the prediction engine, and create a prioritized n-best list of n most probable words to present to the user based on the input to the prediction engine.

Example 5 may include the system of example 4, wherein the prediction engine comprises one of a neural network, a Hidden Markov Model, a statistical language model or any other prediction engine that predicts a next word or stuttered word.

Example 6 may include the system of example 4, wherein the personal language model for the user is generated in a continuous manner over time by monitoring conversations of the user at different contexts and storing the conversations with metadata describing the different contexts to create a timeline of information about the user.

Example 7 may include the system of example 6, wherein the personal language model is adapted as language and vocabulary of the user evolve.

Example 8 may include the system of example 6, wherein the different contexts include at least a location and an activity to make finding particular instances of the conversations easy.

Example 9 may include the system of example 1, wherein to detect a stutter comprises instructions to detect a sound representing a partial word repeated consecutively several times.

Example 10 may include an apparatus for a speaking aid comprising a substrate, and logic coupled to the substrate, wherein the logic includes one or more of configurable logic or fixed-functionality hardware logic, the logic coupled to the substrate to receive speech input from a user, the speech input including a partial sentence with a missing word or the partial sentence with a stuttered word, detect a stutter or pause in the speech input, predict the stuttered word or the missing word, present a predicted word from an n-best list to the user, and if a prompt is received from the user, present a next word from the n-best list until the user speaks a correct word to replace the stutter or the pause.

Example 11 may include the apparatus of example 10, wherein the logic coupled to the substrate to present a predicted word from an n-best list to the user comprises logic to whisper the predicted word into an earpiece of the user.

Example 12 may include the apparatus of example 10, wherein the logic coupled to the substrate to present a predicted word from an n-best list to the user comprises logic to display the predicted word on a display.

Example 13 may include the apparatus of example 10, wherein the logic coupled to the substrate to predict the stuttered word or the missing word comprises logic to input words used prior to the stuttered word or the missing word into a prediction engine, input a personal language model for the user into the prediction engine, if the user stuttered, input a stutter sound into the prediction engine, and create a prioritized n-best list of n most probable words to present to the user based on the input to the prediction engine.

Example 14 may include the apparatus of example 13, wherein the prediction engine comprises one of a neural network, a Hidden Markov Model, a statistical language model or any other prediction engine that predicts a next word or stuttered word.

Example 15 may include the apparatus of example 13, wherein the personal language model for the user is generated in a continuous manner over time by monitoring conversations of the user at different contexts and storing the conversations with metadata describing the different contexts to create a timeline of information about the user.

Example 16 may include the apparatus of example 15, wherein the personal language model is adapted as language and vocabulary of the user evolve.

Example 17 may include the apparatus of example 15, wherein the different contexts include at least a location and an activity to make finding particular instances of the conversations easy.

Example 18 may include the apparatus of example 10, wherein the logic coupled to the substrate to detect a stutter comprises logic to detect a sound representing a partial word repeated consecutively several times.

Example 19 may include a method for a speaking aid comprising receiving speech input from a user, the speech input including a partial sentence with a missing word or the partial sentence with a stuttered word, detecting a stutter or pause in the speech input, predicting the stuttered word or the missing word, presenting a predicted word from an n-best list to the user, and if a prompt is received from the user, presenting a next word from the n-best list until the user speaks a correct word to replace the stutter or the pause.

Example 20 may include the method of example 19, wherein presenting a predicted word from an n-best list to the user comprises whispering the predicted word into an earpiece of the user.

Example 21 may include the method of example 19, wherein presenting a predicted word from an n-best list to the user comprises displaying the predicted word on a display.

Example 22 may include the method of example 19, wherein predicting the stuttered word or the missing word comprises inputting words used prior to the stuttered word or the missing word into a prediction engine, inputting a personal language model for the user into the prediction engine, if the user stuttered, then inputting the stutter sound into the prediction engine, and creating a prioritized n-best list of n most probable words to present to the user based on the input to the prediction engine.

Example 23 may include the method of example 22, wherein the prediction engine comprises one of a neural network, a Hidden Markov Model, a statistical language model or any other prediction engine that predicts a next word or stuttered word.

Example 24 may include the method of example 22, wherein the personal language model for the user is generated in a continuous manner over time by monitoring conversations of the user at different contexts and storing the conversations with metadata describing the different contexts to create a timeline of information about the user.

Example 25 may include the method of example 24, wherein the personal language model is adapted as language and vocabulary of the user evolve.

Example 26 may include the method of example 24, wherein the different contexts include at least a location and an activity to make finding particular instances of the conversations easy.

Example 27 may include the method of example 19, wherein detecting a stutter comprises detecting a sound representing a partial word repeated consecutively several times.

Example 28 may include at least one computer readable medium, comprising a set of instructions, which when executed by a computing device, cause the computing device to receive speech input from a user, the speech input including a partial sentence with a missing word or the partial sentence with a stuttered word, detect a stutter or pause in the speech input, predict the stuttered word or the missing word, present a predicted word from an n-best list to the user, and if a prompt is received from the user, present a next word from the n-best list until the user speaks a correct word to replace the stutter or the pause.

Example 29 may include the at least one computer readable medium of example 28, wherein instructions to cause the computing device to present a predicted word from an n-best list to the user comprises instructions to cause the computing device to whisper the predicted word into an earpiece of the user.

Example 30 may include the at least one computer readable medium of example 28, wherein instructions to cause the computing device to present a predicted word from an n-best list to the user comprises instructions to cause the computing device to display the predicted word on a display.

Example 31 may include the at least one computer readable medium of example 28, wherein instructions to cause the computing device to predict the stuttered word or the missing word further comprises instructions to cause the computing device to input words used prior to the stuttered word or the missing word into a prediction engine, input a personal language model for the user into the prediction engine, if the user stuttered, input a stutter sound into the prediction engine, and create a prioritized n-best list of n most probable words to present to the user based on the input to the prediction engine.

Example 32 may include the at least one computer readable medium of example 31, wherein the prediction engine comprises one of a neural network, a Hidden Markov Model, a statistical language model or any other prediction engine that predicts a next word or stuttered word.

Example 33 may include the at least one computer readable medium of example 31, wherein the personal language model for the user is generated in a continuous manner over time by monitoring conversations of the user at different contexts and storing the conversations with metadata describing the different contexts to create a timeline of information about the user.

Example 34 may include the at least one computer readable medium of example 33, wherein the personal language model is adapted as language and vocabulary of the user evolve.

Example 35 may include the at least one computer readable medium of example 33, wherein the different contexts include at least a location and an activity to make finding particular instances of the conversations easy.

Example 36 may include the at least one computer readable medium of example 28, wherein instructions to cause the computing device to detect a stutter comprises instructions to cause the computing device to detect a sound representing a partial word repeated consecutively several times.

Example 37 may include an apparatus for a speaking aid comprising means for receiving speech input from a user, the speech input including a partial sentence with a missing word or the partial sentence with a stuttered word, means for detecting a stutter or pause in the speech input, means for predicting the stuttered word or the missing word, means for presenting a predicted word from an n-best list to the user, and if a prompt is received from the user, means for presenting a next word from the n-best list until the user speaks a correct word to replace the stutter or the pause.

Example 38 may include the apparatus of example 37, wherein means for presenting a predicted word from an n-best list to the user comprises means for whispering the predicted word into an earpiece of the user.

Example 39 may include the apparatus of example 37, wherein means for presenting a predicted word from an n-best list to the user comprises means for displaying the predicted word on a display.

Example 40 may include the apparatus of example 37, wherein means for predicting the stuttered word or the missing word comprises means for inputting words used prior to the stuttered word or the missing word into a prediction engine, means for inputting a personal language model for the user into the prediction engine, if the user stuttered, then means for inputting the stutter sound into the prediction engine, and means for creating a prioritized n-best list of n most probable words to present to the user based on the input to the prediction engine.

Example 41 may include the apparatus of example 40, wherein the prediction engine comprises one of a neural network, a Hidden Markov Model, a statistical language model or any other prediction engine that predicts a next word or stuttered word.

Example 42 may include the apparatus of example 40, wherein the personal language model for the user is generated in a continuous manner over time by monitoring conversations of the user at different contexts and storing the conversations with metadata describing the different contexts to create a timeline of information about the user.

Example 43 may include the apparatus of example 42, wherein the personal language model is adapted as language and vocabulary of the user evolve.

Example 44 may include the apparatus of example 42, wherein the different contexts include at least a location and an activity to make finding particular instances of the conversations easy.

Example 45 may include the apparatus of example 37, wherein means for detecting a stutter comprises means for detecting a sound representing a partial word repeated consecutively several times.

Example 46 may include the apparatus of example 40, wherein instructions to predict the stuttered or missing word further comprises instructions to input a current context for the user into the prediction engine.

Example 47 may include the at least one computer readable medium of claim 31, wherein instructions to cause the computing device to predict the stuttered word or the missing word further comprises instructions to cause the computing device to input a current context for the user into the prediction engine.

Example 48 may include the method of claim 22, wherein predicting the stuttered word or the missing word further comprises inputting a current context for the user into the prediction engine.

Example 49 may include the apparatus of claim 13, wherein the logic coupled to the substrate to predict the stuttered word or the missing word further comprises logic to input a current context for the user into the prediction engine.

Example 50 may include the system of claim 4, wherein instructions to predict the stuttered word or the missing word further comprises instructions to input a current context for the user into the prediction engine.

Example 51 may include at least one computer readable medium comprising a set of instructions, which when executed by a computing system, cause the computing system to perform the method of any one of examples 19 to 27.

Example 52 may include an apparatus comprising means for performing the method of any one of examples 19 to 27.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A speaking aid system comprising:
   network interface circuitry to receive speech input from a user, the speech input including a partial sentence with a missing word or the partial sentence with a stuttered word;
   a processor coupled to the network interface circuitry;
   one or more memory devices coupled to the processor, the one or more memory devices including instructions, which when executed by the processor, cause the system to:
   detect a stutter or pause in the speech input;
   predict the stuttered word or the missing word using a personal language model for the user generated in a continuous manner over time until the user experiences cognitive deterioration;
   present a predicted word from an n-best list to the user; and
   if a prompt is received from the user, present a next word from the n-best list until the user speaks a correct word to replace the stutter or the pause.

2. The system of claim 1, wherein instructions to present a predicted word from an n-best list to the user comprises instructions to whisper the predicted word into an earpiece of the user.

3. The system of claim 1, wherein instructions to present a predicted word from an n-best list to the user comprises instructions to display the predicted word on a display.

4. The system of claim 1, wherein instructions to predict the stuttered word or the missing word comprises instructions to:
   input words used prior to the stuttered word or the missing word into a prediction engine;
   input the personal language model for the user into the prediction engine;
   if the user stuttered, input a stutter sound into the prediction engine; and
   create a prioritized n-best list of n most probable words to present to the user based on the input to the prediction engine.

5. The system of claim 4, wherein the prediction engine comprises one of a neural network, a Hidden Markov Model, a statistical language model or any other prediction engine that predicts a next word or stuttered word.

6. The system of claim 1, wherein the personal language model for the user is generated by monitoring conversations of the user at different contexts and storing the conversations with metadata describing the different contexts to create a timeline of information about the user.

7. An apparatus for a speaking aid comprising:
   a substrate; and
   logic coupled to the substrate, wherein the logic includes one or more of configurable logic or fixed-functionality hardware logic, the logic coupled to the substrate to:
   receive speech input from a user, the speech input including a partial sentence with a missing word or the partial sentence with a stuttered word;
   detect a stutter or pause in the speech input;
   predict the stuttered word or the missing word using a personal language model for the user generated in a continuous manner over time until the user experiences cognitive deterioration;
   present a predicted word from an n-best list to the user; and
   if a prompt is received from the user, present a next word from the n-best list until the user speaks a correct word to replace the stutter or the pause.

8. The apparatus of claim 7, wherein the logic coupled to the substrate to present a predicted word from an n-best list to the user comprises logic to whisper the predicted word into an earpiece of the user.

9. The apparatus of claim 7, wherein the logic coupled to the substrate to present a predicted word from an n-best list to the user comprises logic to display the predicted word on a display.

10. The apparatus of claim 7, wherein the logic coupled to the substrate to predict the stuttered word or the missing word comprises logic to:
    input words used prior to the stuttered word or the missing word into a prediction engine;
    input the personal language model for the user into the prediction engine;
    if the user stuttered, input a stutter sound into the prediction engine; and
    create a prioritized n-best list of n most probable words to present to the user based on the input to the prediction engine.

11. The apparatus of claim 10, wherein the prediction engine comprises one of a neural network, a Hidden Markov Model, a statistical language model or any other prediction engine that predicts a next word or stuttered word.

12. The apparatus of claim 7, wherein the personal language model for the user is generated by monitoring conversations of the user at different and storing the conversations with metadata describing the different contexts to create a timeline of information about the user.

13. A method for a speaking aid comprising:
    receiving speech input from a user, the speech input including a partial sentence with a missing word or the partial sentence with a stuttered word;
    detecting a stutter or pause in the speech input;
    predicting the stuttered word or the missing word using a personal language model for the user generated in a continuous manner over time until the user experiences cognitive deterioration;
    presenting a predicted word from an n-best list to the user; and
    if a prompt is received from the user, presenting a next word from the n-best list until the user speaks a correct word to replace the stutter or the pause.

14. The method of claim 13, wherein presenting a predicted word from an n-best list to the user comprises whispering the predicted word into an earpiece of the user.

15. The method of claim 13, wherein presenting a predicted word from an n-best list to the user comprises displaying the predicted word on a display.

16. The method of claim 13, wherein predicting the stuttered word or the missing word comprises:
    inputting words used prior to the stuttered word or the missing word into a prediction engine;
    inputting the personal language model for the user into the prediction engine;
    if the user stuttered, inputting a stutter sound into the prediction engine; and
    creating a prioritized n-best list of n most probable words to present to the user based on the input to the prediction engine.

17. The method of claim 16, wherein the prediction engine comprises one of a neural network, a Hidden Markov Model, a statistical language model or any other prediction engine that predicts a next word or stuttered word.

18. The method of claim 13, wherein the personal language model for the user is generated in a continuous manner over time until the user experiences cognitive deterioration by monitoring conversations of the user at different contexts and storing the conversations with metadata describing the different contexts to create a timeline of information about the user.

19. The method of claim 18, wherein the personal language model is adapted as language and vocabulary of the user evolve.

20. At least one non-transitory computer readable medium, comprising a set of instructions, which when executed by a computing device, cause the computing device to:
   receive speech input from a user, the speech input including a partial sentence with a missing word or the partial sentence with a stuttered word;
   detect a stutter or pause in the speech input;
   predict the stuttered word or the missing word using a personal language model for the user generated in a continuous manner over time until the user experiences cognitive deterioration;
   present a predicted word from an n-best list to the user; and
   if a prompt is received from the user, present a next word from the n-best list until the user speaks a correct word to replace the stutter or the pause.

21. The at least one non-transitory computer readable medium of claim 20, wherein instructions to cause the computing device to present a predicted word from an n-best list to the user comprises instructions to cause the computing device to whisper the predicted word into an earpiece of the user.

22. The at least one non-transitory computer readable medium of claim 20, wherein instructions to cause the computing device to present a predicted word from an n-best list to the user comprises instructions to cause the computing device to display the predicted word on a display.

23. The at least one non-transitory computer readable medium of claim 20, wherein instructions to cause the computing device to predict the stuttered word or the missing word further comprises instructions to cause the computing device to:
   input words used prior to the stuttered word or the missing word into a prediction engine;
   input the personal language model for the user into the prediction engine;
   if the user stuttered, input a stutter sound into the prediction engine; and
   create a prioritized n-best list of n most probable words to present to the user based on the input to the prediction engine.

24. The at least one non-transitory computer readable medium of claim 23, wherein the prediction engine comprises one of a neural network, a Hidden Markov Model, a statistical language model or any other prediction engine that predicts a next word or stuttered word.

25. The at least one non-transitory computer readable medium of claim 20, wherein the personal language model for the user is generated by monitoring conversations of the user at different contexts and storing the conversations with metadata describing the different contexts to create a timeline of information about the user.

* * * * *